United States Patent [19]
Nishiura et al.

[11] Patent Number: 5,745,482
[45] Date of Patent: Apr. 28, 1998

[54] REPEATING DEVICE

[75] Inventors: Masaaki Nishiura, Saitama-ken; Shinichi Ooi, Kanagawa-ken, both of Japan

[73] Assignee: Kabushiki Kaisha Toshiba, Kanagawa-ken, Japan

[21] Appl. No.: 481,280

[22] PCT Filed: Nov. 2, 1994

[86] PCT No.: PCT/JP94/01851

§ 371 Date: Aug. 28, 1995

§ 102(e) Date: Aug. 28, 1995

[87] PCT Pub. No.: WO95/12950

PCT Pub. Date: May 11, 1995

[30] Foreign Application Priority Data

Nov. 5, 1993 [JP] Japan .................. 5-277154

[51] Int. Cl.$^6$ .................. H04L 1/08; H04L 9/18; H04N 7/167
[52] U.S. Cl. .................. 370/327; 370/492; 370/522; 380/10; 371/69.1
[58] Field of Search .................. 370/73, 75, 94.1, 370/94.2, 95.1, 110.1, 522, 524, 315, 325, 327, 486, 487, 492, 464, 465, 470, 471, 473, 229, 230, 235, 501; 371/30, 67.1, 69.1; 375/211; 348/7; 379/338; 455/3.1, 6.1, 6.3, 7, 14, 12.1; 340/853.7, 425.1; 380/9, 10, 20

[56] References Cited

U.S. PATENT DOCUMENTS

| | | | |
|---|---|---|---|
| 4,937,821 | 6/1990 | Boulton | 370/482 |
| 5,151,782 | 9/1992 | Farraro | 455/6.1 |
| 5,339,315 | 8/1994 | Maeda et al. | 370/270 |
| 5,359,601 | 10/1994 | Wasilewski et al. | 370/486 |
| 5,421,031 | 5/1995 | De Bey | 455/6.1 |
| 5,506,615 | 4/1996 | Awaji | 348/7 |

FOREIGN PATENT DOCUMENTS 5-284496  10/1993  Japan .
5284496  10/1993  Japan .

OTHER PUBLICATIONS

Electric Communication Technology Deliberative Council Report, Nov. 1963.
Japan Ministry of Posts and Telecommunications, Ministerial Ordinance No. 77, and a Notification No. 803.

*Primary Examiner*—Benedict V. Safourek
*Assistant Examiner*—Seema S. Rao
*Attorney, Agent, or Firm*—Cushman, Darby & Cushman IP Group of Pillsbury, Madison & Sutro LLP

[57] ABSTRACT

In a repeating device for sending chargeable satellite broadcasting received through a BS antenna to a connected cable, a scrambled video signal and an audio signal are separated from each other by a separation part from a satellite broadcast signal. Relevant information packets multiplexed upon the audio signal are separated from each other by a separating part, and common information packets of the relevant information packets are separated from each other by another separation part. Common information packets which are successively sent five times are judged in majority by a majority judgement part. Packets having errors corrected by an error correction part are temporarily stored in a buffer memory. The stored packets are read out three times by a thrice successive sending part wherein the stored packets are successively sent fewer times than the number of times the packets are sent from from an atmospheric transmission system. Subsequently, the packets are multiplexed in time sharing upon the other information packets. The packets are further superimposed by a VBI multiplexing part upon a specific line during a vertical blanking period of the scrambled video signal, and are then transmitted.

7 Claims, 8 Drawing Sheets

CR (BIT SYNCHRONIZATION CODE)   1010101010101010
FC (BYTE SYNCHRONIZATION CODE) 11100101

CR (BIT SYNCHRONIZATION CODE)   1010101010101010
FC (BYTE SYNCHRONIZATION CODE) 11100101

TS --- 91BITS   YES : 1, NO : 0
VS --- 91BITS   ON : 1, OFF : 0

1

REPEATING DEVICE

TECHNICAL FIELD

This invention relates to repeating devices and, particularly, to a repeating device which is used in a CATV (Community Antenna TV, Cable TV) and combined listening/receiving system or the like which individually receives concealment broadcasting from an antenna through a cable.

BACKGROUND TECHNOLOGY

In recent years, concealment broadcasting (broadcasting in which programming is provided only for specific viewers) has started, and a receiving device for receiving the concealment broadcasting has been popularized. The arrangement is such that the concealment broadcasting which uses a concealment broadcasting device is arranged such that a broadcasting station codes or enciphers video and audio signals (hereinafter referred to as "scramble") to transmit the signals so that persons (hereinafter referred to as "non-contractor") other than selected viewers (hereinafter referred to as "contracted viewers") cannot view the program. Further, the contracted viewers are capable of using decoding devices (hereinafter referred to as "decoder"), each decoder having a descrambler for conducting the decoding (hereinafter referred to as "descramble") in which the scrambled signal is returned to the original video and audio signals, so the contracted viewers can view the program. Meanwhile, the arrangement is such that the non-contractors cannot conduct the descramble so that they cannot view the program.

An example of such a concealment broadcasting system will be described as an example of a COATEC (COATEC: Conditional Access Technology Research Institute) system, which is one of several chargeable satellite broadcasting systems presently employed or operated in Japan. FIG. 6 shows an arrangement of a transmitter 100 of the broadcasting station on the transmission side in the COATEC system.

The transmitter 100 uses scramblers 101 and 105 to scramble the video and audio signals. Moreover, a scramble flag is used so that a program received on the receiving side can be judged as being scrambled broadcasting or non-scrambled broadcasting. In the COATEC system, the scramble flag corresponds to the eighth bit (hereinafter referred to as "R#8") of a range bit which is multiplexed upon the audio signal and the twelfth bit of the control code (a video scramble flag, hereinafter referred to as "VS").

The arrangement is such that the transmitter 100 transmits the scramble flag such that the scramble flag is continuously sent (hereinafter referred to as "successive sending"), a plurality of times, by a successive-sending control part 111. The scramble flag is multiplexed upon the scramble audio signal by a multiplexing part 123 and is transmitted, such that the scramble flag is judged in majority by a majority judgment part of the decoder on the receiving side to protect against errors. Furthermore, the transmitter 100 inputs the scramble flag into the scramblers 101 and 105 to conduct an ON/OFF control of the scramble of the video and audio signals.

Furthermore, in the system, in order to send a PN (Pseudorandom Noise) signal (pseudorandom signal) for conducting scramble and descramble from the transmitter 100 to the decoder, the transmitter 100 and the decoder have respective PN generators thereof for generating the same PN signal, and the same PN initial value (cipher key) KS is set to the PN generator with the same timing with respect to the video and audio signals to acquire the wholly identical PN signal.

As a timing signal which sets the PN initial value KS, there is a scramble timing TS. In order to be able to judge, in majority, the scramble timing TS by a majority judgment part of the decoder to protect against the errors, the transmitter 100 is arranged to successively send the scramble timing TS by a successive-sending control part 109, and to multiplex the scramble timing upon the scramble audio signal by the multiplexing part 123 for transmission. Further, the transmitter 100 inputs the scramble timing TS into PN generators 103 and 107 to set the PN initial value KS at the same timing as the PN generators 103 and 107.

The above-described chargeable broadcasting system of the COATEC system uses cipher keys of three kinds (called also "key") discussed below to prevent unauthorized viewing. The cipher keys and relevant information packets (containing four types of information including program information, control information, individual information and message information) will subsequently be described.

The details of the program information, the individual information, the control information and the message information are described in Electric Communication Technology Deliberative Council Report (refer to page 48 to page 57) of the chargeable satellite broadcasting in Japan. Here, these will be described in brief.

The program information is one which is transmitted with a predetermined cycle or period (one second, for example), shouldering the information and the program number which are required for the descramble, such as the cipher keys KS or the like. If the program information is omitted on the decoder side, it is impossible to conduct descrambling for a constant or predetermined period of time. The control information is one which temporarily disables viewing in the case of unpaid audience tariffs, and which can re-enable viewing after payment. The control information can assign a specific decoder to control the ON-OFF of that particular decoder. The individual information is one which is transmitted shouldering cipher keys KW or the like. The individual information includes contract service, contract registration codes, an effective period or the like, and is transmitted only to the decoders of authorized persons who have a viewing contract. The message information is one which transmits the character information such as a name of the program or the like.

The cipher keys will subsequently be described later.

First, the PN initial value KS that is the cipher keys is an initial value which is given to the PN generators 103 and 107 and is used to scramble the video and audio signals in the scramblers 101 and 105. The PN initial value KS is also given to the PN generator to descramble the video and audio signals in the decoder. In this connection, the PN generator is a pseudorandom data generator, and is used to scramble, at random, the video and audio signals to raise the suppression or disguise. The PN initial value intends to update or renew the PN initial value KS during an extremely short period of time, every one second, for example, to raise the security. The following description will be made as if the update period is one second.

The PN initial value KS is transmitted to the decoder as a part of the program information. At this time, incidentally, the program information and the control information are enciphered by the use of the cipher keys KW at a cipher part 113 on the transmission side 100 and, thereafter, the same information is superimposed upon the transmission signal a plurality of times so that the program information and the control information are successively sent by a successive-sending control part 115. Normally, the program information and the control information are successively sent five times. The decoder compares the successively-sent information with each other and conducts majority-judgment processing where the correct information is extracted in accordance with the frequency level (height) in which the information is received.

The cipher keys KW which are transmitted together with the individual information will subsequently be described. The renewal period of the cipher keys KW is usually every one month. Transmission is made in multiple on a broadcasting wave from a broadcasting station, to the decoders of contracted viewers or viewers who pay successively for the next month. However, transmission is not made to non-contractors and decoders in which audience tariffs are unpaid.

A cipher of the received cipher keys KW is decoded by the decoder and, thereafter, is stored in an individual information memory. The cipher is read out of the individual information memory, at any time, and is utilized to decode the program information which includes the PN initial value KW sent every one second. Further, the cipher keys KW are transmitted to each of the decoders from the broadcasting station 100 during every renewal period of the cipher keys KW as a part of the individual information. In this connection, the individual information including the cipher keys KW is enciphered at an encipherment part 117 and, thereafter, is transmitted in superimposition upon a transmission signal, but is not successively sent.

Cipher keys KMi will subsequently be described. The cipher keys KMi are cipher keys which are used upon encipherment of the cipher keys KW or the like to hold or secure the security of the cipher keys KW, at the time when the broadcasting station 100 transmits the individual information including the cipher keys KW, only to the decoders of contracted viewers and viewers who pay successively for the next month.

The cipher keys KMi are ones which are written to a cipher key KMi memory of a decoder upon factory delivery of the decoder, for example, and are different for every decoder. Accordingly, the cipher keys KMi are transmitted separately for every decoder, whereby it is possible to conduct transmission of the corresponding cipher keys KW, separately, for every decoder. That is, it is impossible to decode the cipher keys KW, for decoders which have different non-corresponding transmitted cipher keys KMi.

The aforesaid program information and control information are multiplexed at a multiplexing part 119 upon the individual information and the message information. Moreover, error correction codes are added at an error-correction-code addition part 121 and, thereafter, the program information and control information are multiplexed in time sharing upon a scrambled audio signal by the multiplexing part 123 together with the scramble flag VS, the scramble flag R#8 and the scramble timing TS. Furthermore, the program information and control information are multiplexed in frequency sharing or division upon a scrambled video signal by a multiplexing part 125 and is transmitted.

By the way, a common receiving system has been proposed in which waves transmitted from the transmitter 100 of the chargeable satellite broadcasting of the COATEC system in FIG. 6 pass through a broadcasting satellite (hereinafter referred to as "BS"), are supplied to a repeating device (hereinafter referred to as "head end") such as a CATV (Community Antenna TV, Cable TV) and a listening-together receiving system or the like through an antenna, and are individually distributed from the head end to the decoder of each contracted viewer through a cable. With regard to the system, there is, a "Chargeable Broadcasting Apparatus" which has been filed, as a patent, by the present applicant to Japanese Patent Office on Mar. 31, 1992 (Specification of Japanese Patent Application No, 77936/1992).

FIG. 7 shows a chargeable satellite broadcasting system relating to the above-described patent application. A BS broadcasting wave which has been transmitted from the transmitter (broadcasting station) 100 passes through a BS1, is received by a BS antenna 2 for common receiving, and is sent to a head end 3. The head end 3 conducts, in FM, detection of the BS broadcasting wave by a BS tuner. Moreover, the head end 3 conducts separation of a scrambled video signal and a bit stream from each other. Furthermore, the head end 3 separates, from the bit stream, the scrambled audio signal, an information signal for conducting the descramble (the scramble timing TS and the scramble flags VS and R#8) and relevant information packets (the program information, the control information, the individual information and the message information) from each other and, thereafter, the information signal for conducting the descramble is packeted. Packets of the packeted information signal for conducting the descramble are multiplexed, in time sharing, upon the relevant information packets and, thereafter, are multiplexed upon (superimposed upon) a specific plurality of lines during a vertical blanking period (hereinafter referred to as "VBI") of the scrambled video signal. Moreover, the VBI-multiplexed scrambled video signal, and the signal in which the scrambled audio signal is descrambled are respectively remodulated (RF-modulation), multiplexed in frequency, sent out to a cable 4.

Decoding devices (hereinafter referred to as "VBI corresponding decoders") 5 which correspond to the plurality of VBI multiplexing of the respective users are connected to the cable 4. The VBI corresponding decoder 5 conducts AM detection by a VHF-UHF tuner, and conducts separation of the scrambled video signal and the audio signal from each other. Further, the VBI corresponding decoder 5 separates the packets which are superimposed upon the VBI of the scrambled video signal and, thereafter, the scrambled video signal is descrambled on the basis of the information packets for descrambling of the separated packets. In this connection, the audio signal is further demodulated in audio. The demodulated video signal and audio signal are inputted to a television (TV) (not shown).

In FIG. 7, it is assumed that an atmospheric system which conducts signal transmission by the waves from the transmitter to the head end through the satellite is a first signal transmission system, and a cable system which conducts signal transmission from the head end to the decoder (on the side of a terminal) is a second signal transmission system.

FIG. 8 is a block diagram showing an arrangement of the head end 3 of the chargeable broadcasting system shown in FIG. 7, while FIG. 9 is a block diagram showing an arrangement of the VBI corresponding decoder 5.

The head end 3 shown in FIG. 8 separates the scrambled video and the audio signal by a separation part 11 and, thereafter, separates the scramble flag VS, the scramble flag R#8, the scramble timing TS and the relevant information packets in which the relevant information is packeted from the scrambled audio signal in a separation part 13. The majority judgment described above is conducted and, thereafter, the separated scramble timing TS is inputted to a packeting part 45 and a PN generator 37 at a majority judgment part 15. The scramble flag VS and the scramble flag R#8 conduct the majority judgment at a majority judgment part 17 and, thereafter, both the scramble flag VS and the scramble flag R#8 are inputted to a descrambler 39. The scramble flag VS is also inputted to the packeting part 45. In this connection, the scramble flag R#8 is not transmitted to the packeting part 45. At the packeting part 45, the scramble timing TS and the scramble flag VS are packeted.

Further, the relevant information packets are separated from each other by a separation part 19 into common information (program information and control information), individual information and message information in accordance with sort identification codes in the data. Of these, the common information (the program information and the control information) conducts the majority judgment at the majority judgment part 21. Moreover, error correction is conducted at an error correction part 23 and, thereafter, the common information (the program information and the control information) is inputted to a decoding part 25. Furthermore, with regard to the individual information, error correction is conducted at an error correction part 29 and, thereafter, the individual information is inputted to a decoding part 33. The message information conducts error correction at an error correction part 54 and, thereafter, is inputted to a buffer memory 55.

In common information (the program information and the control information), the cipher keys KW which are stored in an individual information memory 35 are used so that the cipher keys KS or the like are decoded at the decoding part 25. Furthermore, the PN initial value KS from the decoding part 25 is inputted to the PN generator 37. The other data are given to an attention right-or-wrong judgment part 27. In this connection, in the individual information, the cipher keys KMi are used in the decoding part 33 so that the cipher keys KW or the like are decoded and, thereafter, the individual information is stored in the individual information memory 35.

Further, the scrambled audio signal which is separated by the separation part 13 is descrambled in accordance with the scramble flag R#8, the scramble timing TS and the PN signal by the descrambler 39, and is inputted to a frequency multiplexing part 53.

The relevant information packets which are outputted from the error correction parts 23, 29 and 54 are stored in three buffer memories including a buffer memory 41, a buffer memory 43 and the buffer memory 55, so that temporal retention or holding and conversion of the data rate are required for multiplexing upon the VBI. Of them, the common information (the program information and the control information) packets are stored in the buffer memory 41 and, thereafter, the same data are read out a plurality of times for successive sending and processing. Here, the common information packets are successively sent five times in the same way as or identically to the transmission side (satellite system).

The common information (the program information and the control information) packets, the individual information packets, the message information packets, and the packets in which the scramble timing TS and the scramble flag VS are packeted in the packeting part 45 (hereinafter this packet is called a "scramble timing TS packet") are multiplexed in time sharing by a time-sharing multiplexing part 47. Bit synchronization and byte synchronization, similar to character multiple broadcasting, are added by a bit synchronization and byte synchronization addition part 46.

Moreover, the signal is VBI-multiplexed upon a VBI of the video signal which is not descrambled (that is, the scrambled video signal) by a VBI multiplexer of a VBI multiplexing part 51, similarly to the character multiplexing broadcasting.

Here, the transmitting packets will be described. In case of the character multiple broadcasting, according to a ministerial ordinance No. 77 and a notification No. 803 of Japan Ministry of Posts and Telecommunications relating to television character multiple broadcasting, the number of bits of data capable of being transmitted by a single line is 272 bits and a prefix. If the bit synchronization and the byte synchronization are also added the total number of bits is 296 bits. The relevant information packets in the chargeable satellite broadcasting (BS) are such that the number of bits in each packet except for the header is just 272 bits. If the arrangement is a packet arrangement of the character multiple broadcasting, it is possible to transmit the packets only during a single line period.

Further, in the chargeable satellite broadcasting system, the first eight bits of the data of 272 bits are sort identification, and are used for identification of the program information, the control information, the individual information and the message information. Also in the character multiple broadcasting, assuming that the first eight bits of the data of 272 bits are sort identification, data which is different from each other in every packet are allocated whereby identification of the packets is made on receiving side. In this respect, the chargeable satellite broadcasting and the character multiple broadcasting can be similarly treated.

Accordingly, the bit synchronization and the byte synchronization similar to the character multiple broadcasting are added to the 272 bits (the number of bits in each packet, except for the header) from the relevant information packets to VBI-multiplex the relevant information packets of a satellite system to transmit the packets. Thereafter, the VBI multiple is made to the video signal, whereby, on the receiving side, it is possible to use a signal processing IC for the character multiple broadcasting, and this becomes advantageous in view of the cost.

The number of lines which is required for the transmission of relevant information packets which are VBI-multiplexed will subsequently be described. In the chargeable satellite broadcasting system, the period (transmitting interval) of the relevant information packets is 9 ms. Accordingly, the transmitting capacity (transmitting speed or velocity) of the packets is about 111 packet/s. Moreover, transmission of the scramble timing TS packets is at most a few packets per 1 s (it is assumed that the period of the scramble timing TS=1 s), even in consideration of successive sending. If, in the packet transmission of the VBI multiple in the character multiple broadcasting, two lines are used in the packet transmission for each field (that is, one field is 1/60 s, and two packets are transmitted for each field), the period (transmission interval) of the packets is 8.35 ms, and the transmission capacity of the packets is about 120 packet/s. Accordingly, since the packet transmission capacity in the character multiple broadcasting is larger than the transmission capacity of the scramble timing TS packets and the relevant information packets in the chargeable satellite broadcasting (COATEC System), it can be possible to transmit sufficiently the scramble timing TS packets and the relevant information packets, to the VBI of the video signal.

Description of the VBI corresponding decoder 5 shown in FIG. 9 will subsequently be made. In the VBI corresponding decoder 5, the audio signal and the video signal which are multiplexed in frequency are separated from each other in a separation part 61, and the packets which are multiplexed upon the VBI of the video signal are separated from each other by a VBI separation part 63. It is possible to utilize, in the VBI separation part 63, a signal processing IC (a waveform equivalent IC, a synchronization separation IC, a character multiple extracting IC or the like) which has been developed for receiving of character multiple broadcasting. The packets which are separated from each other by the VBI separation part 63 are separated into the relevant information packets and the scramble timing TS packets in accordance with the kinds thereof, at a separation part 65.

The scramble timing TS packets which are separated from each other by the separation part 65 are judged in majority in a majority judgment part 85 so that the scramble timing TS and the scramble flag VS are extracted. The scramble timing TS and the scramble flag VS are inputted respectively to a PN generator 87 and a descrambler 89.

Moreover, the relevant information packets which are separated from each other by the separation part 65 are separated into packets including the common information (the program information and the control information), the individual information and the message information, depending upon the sort identification, by a separation part 67. Of these, the common information (the program information and the control information) packets are judged in majority in a majority judgment part 68 and, thereafter, pass through an error correction part 69 and are inputted to a decoding part 77. Moreover, the individual information packets pass through an error correction part 72 and, thereafter, are inputted to a decoding part 73. Since the message information packets are not enciphered, the message information packets pass through an error collection part 74 and, thereafter, are displayed at a message display part 91 without requiring decoding.

The common information (the program information and the control information) packets are arranged such that the information including the cipher key KS is decoded using the cipher keys KW, in the decoding part 77. The obtained or acquired PN initial value KS is inputted to the PN generator 87. The other data are given to an attention right-and wrong judgment part 79. In this connection, the individual information packets are such that the cipher keys KW or the like are decoded by the use of the cipher keys KMi from a cipher key KMi memory 71 in the decoding part 73. Thereafter, the individual information packets are stored in an individual information memory 75.

The attention right-or-wrong judgment part 79 compares the program information and the data within the individual information memory 75 with each other, to conduct attention right-or-wrong judgment. Based on the results of the judgment, the descrambler 89 conducts the ON/OFF of the descrambling operation. Specifically, the contents of the individual information are not compatible with the program such that if the result of the attention right-or-wrong judgment is "no", the decoder cannot descramble the signal and cannot transmit the program to the viewer even if the viewer is contracted.

By the way, the chargeable satellite broadcasting apparatus described above has the following problem. Specifically, in order to raise the security with respect to the error, the common information (program information and control information) is successively sent five times on the transmission side. In the head end 3, the relevant information packets which are multiplexed upon the audio signal are separated from each other and, thereafter, the common information packets are separated from each other by judgment of the sort identification of the packets. The common information packets are successively sent five times to the transmission side (satellite system), so as to be sent to the CATV cable 4. Thus, a transmission path is crowded.

In view of the above, an object of the invention is to provide a head end which can dissolve congestion or confusion of a CATV transmission path and can secure the number of successive sending times is required for conducting majority judgment on the decoder side.

DISCLOSURE OF THE INVENTION

A head end according to a first invention is characterized by comprising:

packet extracting means for receiving a transmission signal transmitted by a first signal transmission system to extract information packets in which the information packets having the same contents as each other are transmitted a plurality of times into said first transmission signal; and successive-sending processing means for transmitting said information packets to a second signal transmission system through the number of successive sending times which is less than that when said information packets are transmitted from said first signal transmission system.

According to the first invention, it is possible to reduce congestion of the transmission path when packet transmission is made to the second signal transmission system.

A head end according to a second invention is characterized by comprising:

packet extracting means for extracting information packets from a first signal transmission system in which a transmission signal including a video signal and the information packets having an information signal except for said video signal; and signal sending means for sending the information packets which are extracted by said packet extracting means and which have the same contents as each other, to a second signal transmission system a plurality of times at timing synchronized with said video signal, together with said video signal.

According to the second invention, it is possible to successively send the same packets a plurality of times at the same timing as the video signal, and it is possible to secure that packet detection is conducted on a decoder side.

A head end according to a third invention is characterized by comprising:

packet extracting means for receiving a transmission signal from a first signal transmission system to extract information packets; and error correction processing means for conducting error correction of said information packets and for judging right-or-wrong of the correction, said error correction processing means transmitting correction packets to the subsequent stage in case where correction can be conducted, and not transmitting error packets in case where correction cannot be conducted.

According to the third invention, it is possible to transmit only the information packets in which the error correction can be conducted to the subsequent stage.

BEST MODES FOR CARRYING OUT THE INVENTION

The invention will be described in each with reference to illustrated embodiments.

Figure 1:
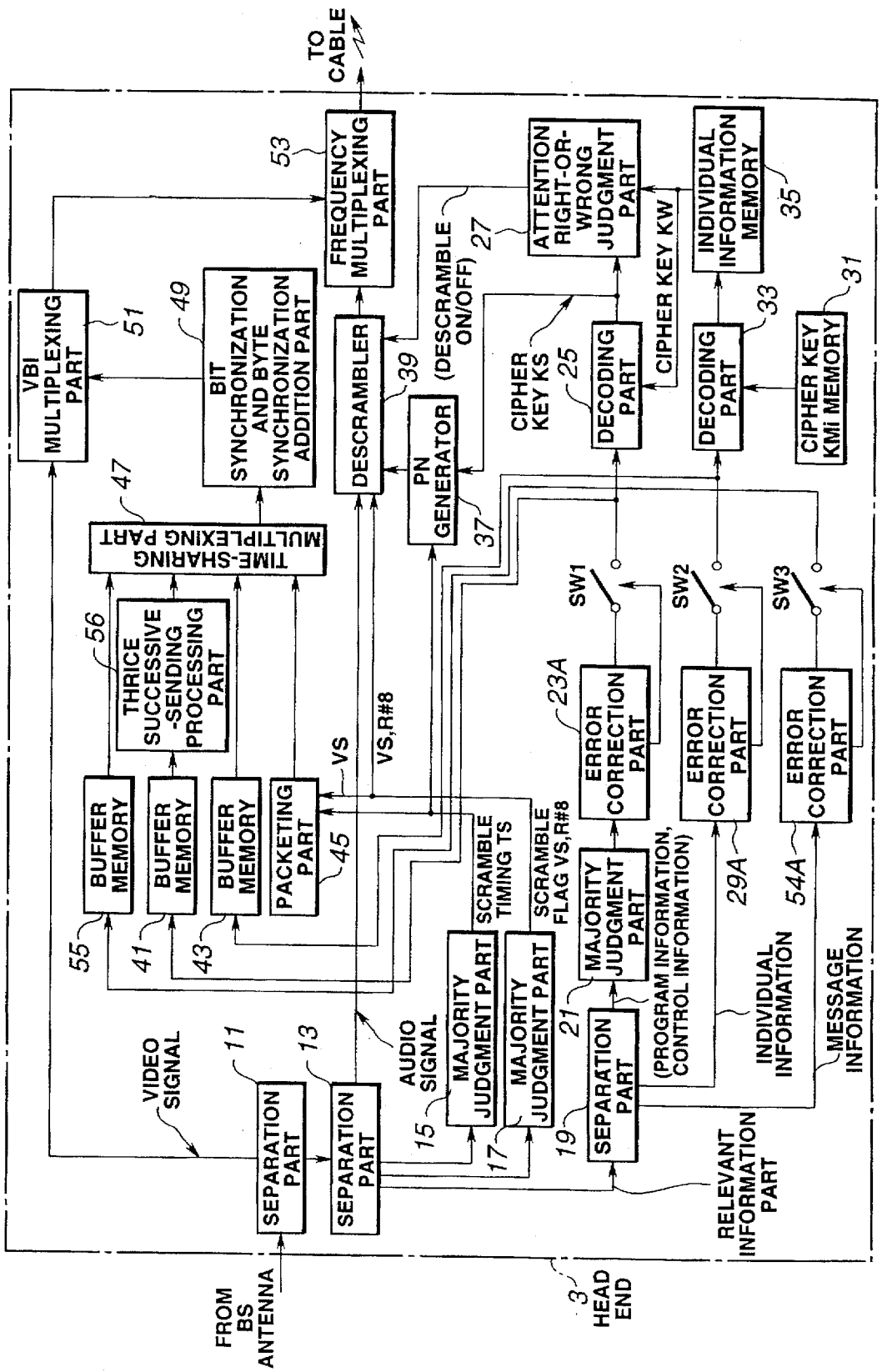
FIG. 1 is a block diagram showing a schematic arrangement of an embodiment of a head end according to the invention.
Figure 2:
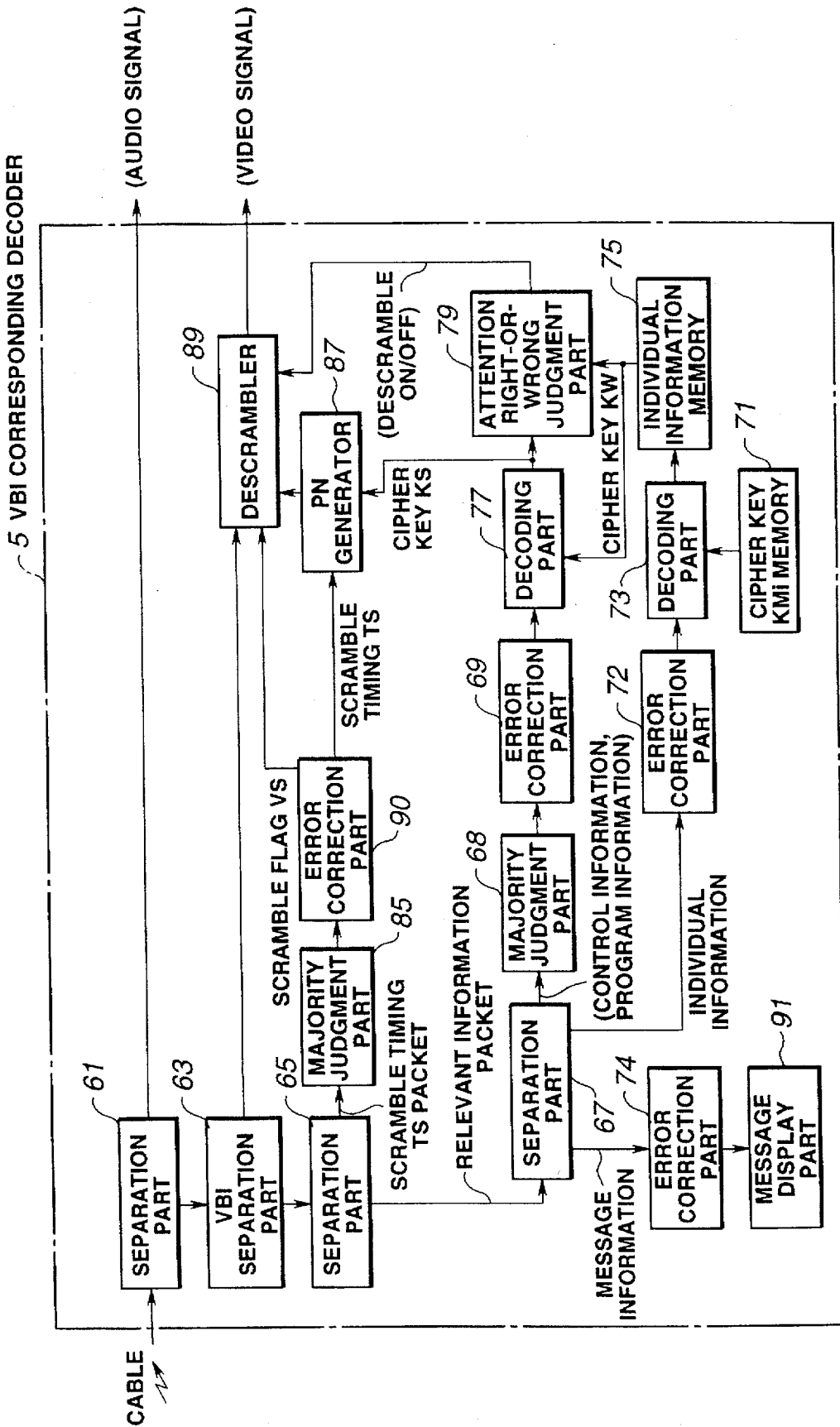
FIG. 2 is a block diagram showing a schematic arrangement of an embodiment of a VBI corresponding decoder which corresponds to that shown in FIG. 1.
Figure 8:
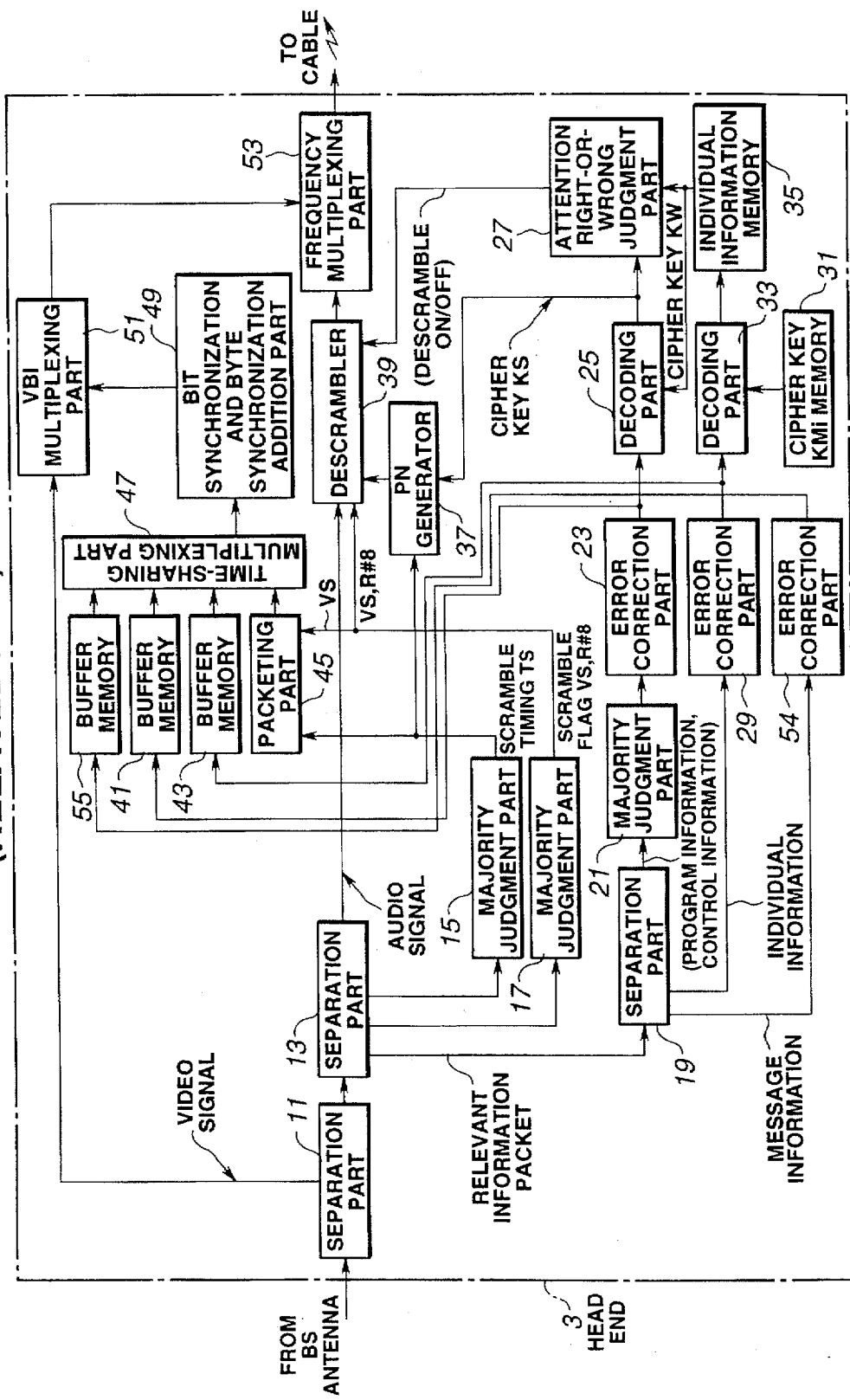
FIG. 8 is a block diagram showing a schematic arrangement of a head end of the chargeable broadcasting system shown in FIG. 7.
Figure 9:
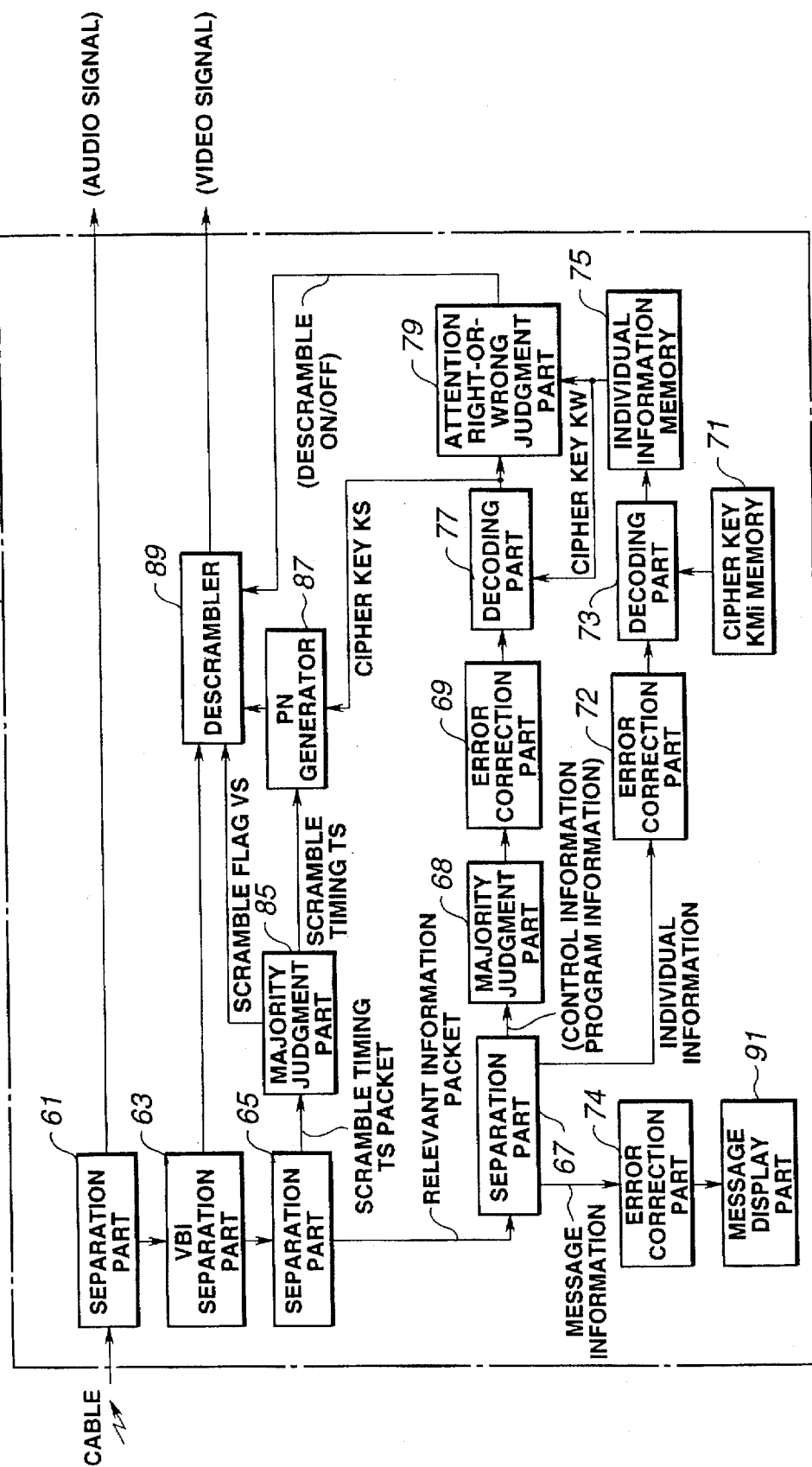
FIG. 9 is a block diagram showing a schematic arrangement of a VBI corresponding decoder of the chargeable broadcasting system shown in FIG. 7.

FIG. 1 is a block diagram showing a schematic arrangement of an embodiment of a head end in a disguise or concealment broadcasting apparatus relating to the present invention, while FIG. 2 is a block diagram showing a schematic arrangement of the VBI corresponding decoder 5. In these figures, the same or identical reference numerals are applied to portions which are the same as those shown in FIG. 8 and FIG. 9, and the portions will be described.

In FIG. 1, the head end 3 comprises in part a separation part 11 for separating a scrambled video signal from a chargeable satellite broadcasting signal from a BS antenna (not shown) to supply the video signal to the VBI multiplexing part 51. The separation part 13 is connected to the separation part 11 for separating a scrambled audio signal to supply the audio signal to the descrambler 39. The separation part 13 is also for separating the scramble timing TS to output the same to the majority judgment part 15, for separating the scramble flag VS and the scramble flag R#8 to output the same to the majority judgment part 17, and for separating relevant information having the common information (the program information and the control information) and the individual information and the message information. The relevant information is output to the separation part 19. The majority judgment part 15 is provided for judging, in majority, the scramble timing TS to output the judgment results to the PN generator 37 and the packeting part 45, and the majority judgment part 17 for judging, in majority, the scramble flag VS to output the judgment results to the descrambler 39 and the packeting part 45. The separation part 19 is provided for separating the individual information to output the same to an error correction part 29A, for separating the common information (the program information and the control information) to output the same to the majority judgment part 21 and for separating the message information to output the same to an error correction part 54A. An error correction part 23A is provided for reviewing the majority judgment from the majority judgment part 21 to judge error correction and the success or failure of the correction regarding the judged results. The error correction part 54A turns off a switch SW1 if the error is able to be corrected to output the corrected packet to the decoding part 25 and the buffer memory 41. The decoding part 25 decodes the program information and the control information to output the same to the attention right-or-wrong judgment part 27 and to output the PN initial value to the PN generator 37. The attention right-or-wrong judgement part 27 judges the right or wrong of attention and outputs the judgment results to the descrambler 39. The error correction part 29A acquires the individual information which is separated by the separation part 19, judges the error correction and the right-or-wrong of correction, and closes a switch SW2 if the error is able to be corrected to output the correction packets to the decoding part 33 and the buffer memory 43. The error correction part 54A acquires the message information which is separated by the separation part 19, judges the error correction and the right-or-wrong of correction, and closes a switch SW3 if the error is able to be corrected to output the correction packet to the buffer memory 55. The decoding part 33 decodes the individual information from the error correction part 29A on the basis of the cipher keys KMi which are read out from the cipher key KMi memory 31, to output the same to the individual information memory 35. The individual information memory 35 stores the individual information which is decoded by the decoding part 33. The PN generator 37 generates the pseudorandom (PN) signal on the basis of the PN initial value KS which is outputted from the decoding part 25. The descrambler 39 descrambles a scrambled audio signal from the separation part 13, to output the same to the frequency multiplexing part 53. The buffer memory 41 temporarily stores the program information and the control information from the error correction part 23A. Similarly, the buffer memory 43 temporarily stores the individual information from the error correction part 29A, and the buffer memory 55 temporarily stores the message information from the error correction part 54A. A thrice-successive-sending processing part 56 reads out the common information packets stored in the buffer memory 41 three times to successively send the same. The packeting part 45 packets the scramble timing TS and the scramble flag VS. The time-sharing multiplexing part 47 inputs into the bit synchronization and byte synchronization part 49 the common information packets (the program information and the control information packets), the individual information packets and the message information packets from the buffer memory 41, the buffer memory 43 and the buffer memory 55, and the scramble timing TS packets from the packeting part 45, to multiplex the same by time sharing to output the same. The bit synchronization and byte-synchronization addition part 49 adds bit synchronization and byte synchronization to an output signal of the time-sharing multiplexing part 47. The VBI multiplexing part 51 multiplexes an output signal from the bit synchronization and byte-synchronization addition part 49 upon a vertical blanking period of a scrambled video signal from the separation part 11. The frequency multiplexing part 53 multiplexes, in frequency, an output signal from the VBI multiplexing part 51 upon the audio signal which is descrambled by the descrambler 39. The switches SW1, SW2 and SW3 respond based on whether or not error correction of the information packets can be conducted by the error correction parts 23A, 29A and 54A, the switches SW1, SW2 and SW3 being closed (ON) when the error correction can be conducted to transmit the correction information packets to the subsequent stage, and the switches SW1, SW2, and SW3 being open (OFF) when error correction is impossible to prevent transmission of the error information packets to the subsequent stage.

Further, as shown in FIG. 2, the VBI corresponding decoder 5 comprises in part a separation part 61 for separating the descrambled audio signal to output the same, and a VBI separation part 63 for separating the scrambled video signal which is VBI multiplexed by the VBI multiplexing part 51 of the head end 1, to output the same to the descrambler 89. A separation part 65 separates the relevant information packets, packets of the common information (the program information and the control information), the individual information and the message information and the scramble timing TS packets (the packeted scramble flag VS and scramble timing TS) from the VBI multiplexed scramble video signal. The separation part 67 separates the packets of the common information (the program information and the control information), the individual information and the message information from the separated relevant information packets. The majority judgment part 68 judges in majority the separated common information (the program information and the control information) packets, and the error-correction part 69 corrects the error in the common information packets which are judged in majority. The error correction part 72 corrects the error in the individual information packets which are separated from each other by the separation part 67. The cipher key KMi memory 71 and the decoding part 73 decode the individual information packets after being error corrected using the cipher keys KMi. The individual information memory 75 stores the decoded individual information. The decoding part 77 decodes the common information (the program information and the control information) packets which are corrected in error, by using the cipher keys KW. The attention right-or-wrong judgment part 79 compares the decoded program information and the data within the individual information memory 75 with each other to conduct attention right-or-wrong judgment and thereby switch the ON-and OFF-control of the descrambler 89 in accordance with the judgment. The majority judgment part 85 judges, in majority, the scramble timing TS packets which are separated from each other by the separation part 65. An error correction part 90 corrects, in error, the result in which the majority judgment is conducted, to output the scramble flag VS to the descrambler 89 and to output the scramble timing TS to the PN generator 87. The PN generator 87 generates the pseudorandom (PN) signal by using the scramble timing TS and the PN initial value KS. The descrambler 89 descrambles the scrambled video signal from the VBI separation part 63 on the basis of the scramble flag VS from the majority judgment part 85 and the PN signal from the PN generator 87, to output the same. The error correction part 74 corrects, in error, the message information packets which are separated from each other by the separation part 67, and the message display part 91 displays the error-corrected message information packets.

Operation of the head end 3 in the present embodiment will subsequently be described in more detail with reference to FIG. 1.

First, in the head end 3 illustrated in FIG. 1, the video and audio signals are separated from each other by the separation part 11. The scramble flag VS, the scramble flag R#8, the scramble timing TS (which are further multiplexed upon the audio signal) and the relevant information packets in which the relevant information is packeted all are separated from each other by the separation part 13. After the separated scramble timing TS has conducted the majority judgment at the majority judgment part 15, the scramble timing TS is inputted to the PN generator 37 and the packeting part 45. After the majority judgment has been conducted at the majority judgment part 17, the scramble flag VS and the scramble flag R#8 are both inputted to the descrambler 39. The scramble flag VS is inputted also to the packeting part 45. In this connection, the scramble flag R#8 is not transmitted to the packeting part 45.

Further, the relevant information packets are separated in the separation part 19 into the common information (the program information and the control information), the individual information and the message information in accordance with the sort identification in the data. Of them, with regard to the common information (the program information and the control information), the common information packets which are successively sent five times from the transmission side (satellite system) are judged in majority judgment by the majority judgment part 21, and the judgment result thereof further conducts error correction at the error correction part 23A. Thereafter, the common information (the program information and the control information) is inputted to the decoding part 25 and the buffer memory 41 through the switch SW1. Furthermore, after the error correction has been conducted at the error correction part 29A, the individual information is inputted to the decoding part 33 and the buffer memory 43 through the switch SW2. After the error correction has been conducted at the error correction part 54A, the message information is inputted to the buffer memory 55 through the switch SW3.

As a result of the fact that the error correction has been conducted at the error correction parts 23A, 29A and 54A, the switches S1~SW3 are closed (ON) if the error can be corrected, while the switches SW1~SW3 are open (OFF) if correction is impossible. Accordingly, only the information packets in which errors are corrected are stored in the buffer memories 41, 43 and 55 of the subsequent stage. When the error correction is impossible, uncorrected packets are not transmitted to the subsequent stage.

Regarding the common information (the program information and the control information), the information including the cipher keys KS is decoded in the decoding part 25 by the use of the cipher keys KW which are stored in the individual information memory 35. The PN initial value KS is inputted to the PN generator 37. The other data are given to the attention right-or-wrong judgment part 27. Moreover, the cipher keys KW or the like are decoded in the decoding part 33 by the use of the cipher keys KMi and, thereafter, the individual information is stored in the individual information memory 35.

Moreover, the scrambled audio signal which is separated by the separation part 13 is descrambled by the descrambler 39 in accordance with the scramble flags VS and R#8 and the PN signal, and the descrambled audio signal is inputted to the frequency multiplexing part 53.

Since temporal holding or retention of the data and conversion of the data rate are required for multiplexing upon the VBI, the relevant information packets in which the error correction parts 23A, 29A and 54A are outputted are stored in three buffer memories including the buffer memory 41, the buffer memory 43 and the buffer memory 55. Of them, the common information (the program information and the control information) packets are stored in the buffer memory 41 and, thereafter, the same data are read out three times in order to successively send, three times, the stored packets by the thrice-successive sending processing part 56. Thus, the common information packets which are transmitted by successive sending five times from the transmission side (satellite system) successively send the packets three times in which the error correction can be conducted. In this manner, the reason for transmitting the packets three times successively is that three successively sent packets are required for conducting the majority judgment on the decoder side. Furthermore, three successive transmissions is the minimum number required for majority judgment. Thus, it is possible to keep the confusion of the transmission path of the CATV cable to a minimum. Moreover, in consideration of compatibility with respect to the character multiple broadcasting, packet superimposition is conducted upon seventeenth and nineteenth lines and two hundred eightieth and two hundred eighty-second lines. Thus, since there is a transmitting capacity of four packets per single frame, there is an advantage that the three successively sent packets relating to the above-described majority judgment can be sent by a single frame. In this connection, the packets may be successively sent three or four times to a line in which the VBI is blank (seventeenth twentieth lines, for example). In this case, it is possible to transmit the successively sent packets relating to the majority judgment by a single field. In this manner, the successively sent packets relating to the majority judgment are transmitted by a single frame or a single field which is synchronized with the video signal, whereby, on the decoder side, the packets of the majority judgment can be taken in or be fetched at the same timing as the video signal so that it is possible to ensure that the detection of the packets is conducted. In this connection, the arrangement may be such that, not limited to a case where the same packets are successively sent, the packets which are convenient upon handling if the packets are grouped (packets meaningful in successive sending) are superimposed upon the VBI at the timing of the video signal, and, on the decoder side, these packets are detected at the same timing as the video signal.

Meanwhile, the scrambled video signal which is separated by the separation part 11 is inputted to the VBI multiplexing part 51. In the time-sharing multiplexing part 47, the common information (the program information and the control information) packets, the individual information packets, the message information packets and the scramble timing TS packets in which the scramble timing TS and the scramble flag VS are packeted in the packeting part 45 are all multiplexed upon each other in time sharing. Bit synchronization and byte synchronization similar to those of character multiple broadcasting are added by the bit-synchronization and byte-synchronization addition part 46.

Moreover, the signal is multiplexed upon (superimposed upon) the VBI of the video signal which is not descrambled by the VBI multiplexer of the VBI multiplexing part 51 (that is, the scrambled video signal), similarly to character multiple broadcasting. In the present COATEC system, the VBI multiple period is the seventeenth and nineteenth lines of the first field and the two hundred eightieth and two hundred eighty-second lines of the second field of the video signal, in consideration of the compatibility with respect to the character multiple broadcasting, as described before.

The frequency multiplexing part 53 remodulates (RF-modulates) the scrambled video signal (a signal in which the packets are VBI-multiplexed) from the VBI multiplexing part 51, and re-modulates (RF-modulates) the audio signal from the descrambler 39, to multiplex in frequency both of the signals to output the same to a CATV cable (not shown).

It is as described before that the chargeable satellite broadcasting and the character multiple broadcasting can be treated or handled similarly in that, in the chargeable satellite broadcasting system, first eight bits of a data region of 272 bits are the sort identification and are used for identification of the program information, the control information, the individual information and the message information. Similarly also in the character multiple broadcasting, the first eight bits of data of 272 bits are sort classification, and data which is different in every packet are allocated whereby the packets are identified on the receiving side.

Thus, in order to VBI-multiplex the relevant information packets in the present embodiment to transmit the same, the bit synchronization and the byte synchronization similar to those in the character multiple broadcasting are added to 272 bits, except for the header, from the relevant information packets in the chargeable satellite broadcasting so that the data becomes 296 bits.

Figure 3:
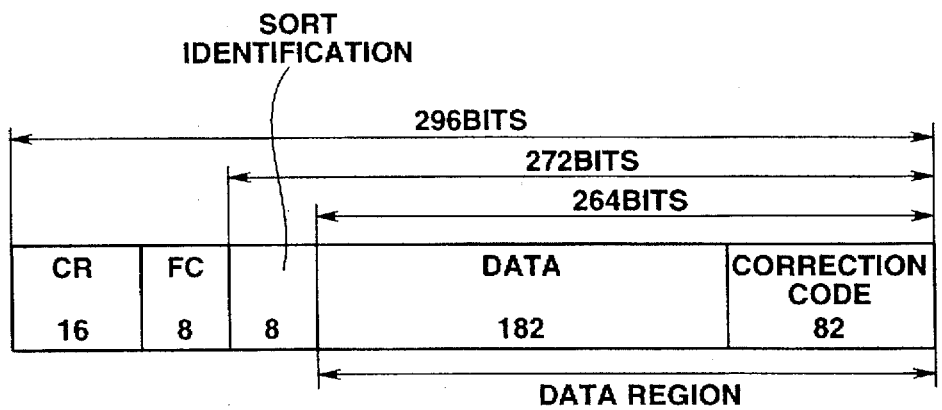
FIG. 3 is a view showing an arrangement of relevant information packets which correspond to those shown in FIG. 1.
Figure 4:
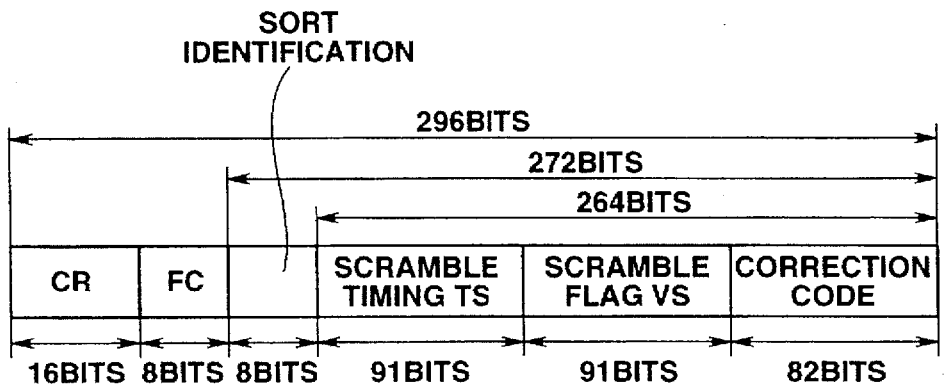
FIG. 4 is a view showing an example of an arrangement of scramble timing TS packets which correspond to those shown in FIG. 1.
Figure 5:
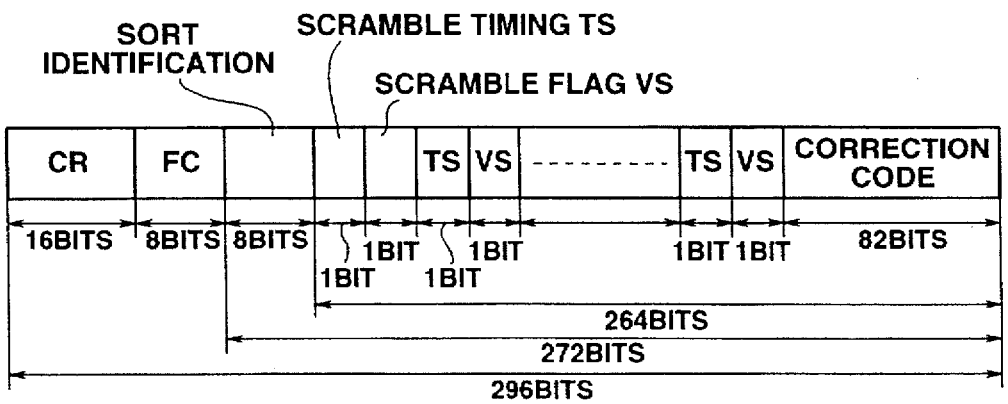
FIG. 5 is a view showing another arrangement example of the scramble timing TS packets which correspond to those shown in FIG. 1.
Figure 6:
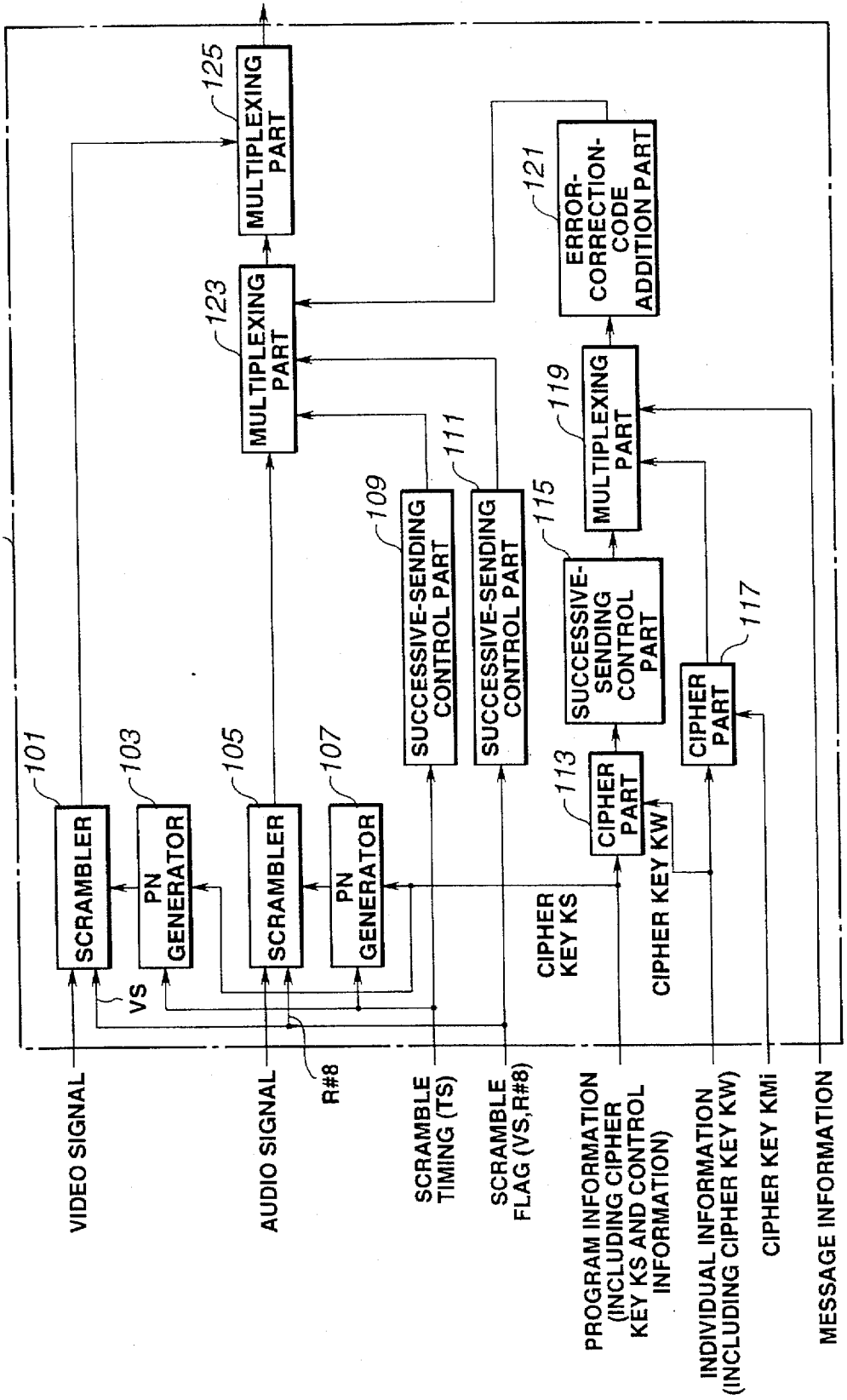
FIG. 6 is a block diagram showing a schematic arrangement of a transmitter in a COATEC system.
Figure 7:
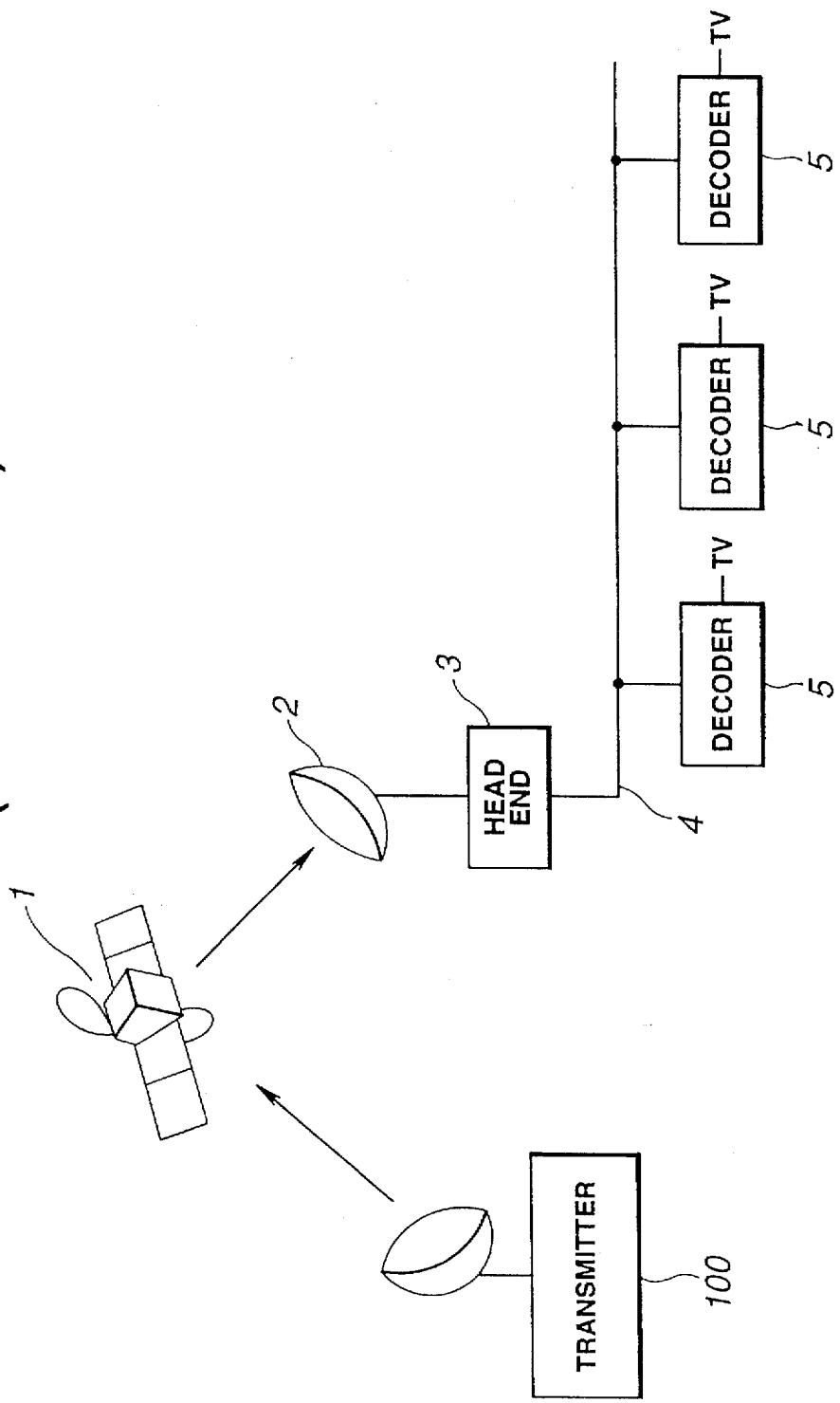
FIG. 7 is a view describing a chargeable satellite broadcasting system in the application which has already been filed.

FIG. 3 shows an arrangement example of the relevant information packets (the common information packets, the individual information packets and the message information packets), while FIG. 4 and FIG. 5 show an arrangement example of the scrambled timing TS packets. Of the data region of 272 bits, the sort identification is 8 bits, the packet data are 182 bits and the error correction code (redundant bit) is 82 bits. The arrangement of the scrambled timing TS packets in FIG. 4 and FIG. 5 will be described in detail in the subsequent description of the packeting part 45.

Subsequently, the packeting part 45 when packets the scramble timing TS and the scramble flag VS will be described.

It is assumed that, in the packeting part 45, the sort identification is different between the common information (the program information and the control information), the individual information and the message information, [11111111]. For example, the sort identification is sent by the first 8 bits in the data region of 272 bits, while the data of the scramble timing TS and the scramble flag VS are transmitted by 182 bits of the remaining 264 bits, and the error correction code of the data is transmitted by 82 bits.

FIG. 4 and FIG. 5 show an arrangement example of the scramble timing TS packets. In this connection, the sort identification of the common information (the program information and the control information) is [01111000], and the sort identification of the individual information is [10000111].

First, it is assumed that, in FIG. 4, the scramble timing TS and the scramble flag VS each transmit data of 91 bits, the data of the scramble timing TS and the scramble flag VS are all 0 or all 1, and the data are judged in majority on the decoder side. The majority judgment is processed by counting the number of 0 bits and 1 bits and comparing the result to a predetermined number. If the number of 0 bits is greater than or equal to a predetermined number, for example, the data are deemed to be 0. If the number of 0 bits is less than the predetermined number, the data are deemed to be 1. For example, the scramble timing TS is arranged as follows: That is, if the data equal to or more than 72 bits are 1, it is deemed to be the scramble timing TS. The scramble flag VS is such that, if data equal to or more than 72 bits are 1, it is deemed to be scrambled, while, if data equal to or more than 72 bits are 0, it is deemed to be non-scrambled.

Subsequently, FIG. 5 shows that each of the scramble timing TS and the scramble flag VS transmits data of 91 bits, and is the same as FIG. 4. However, the scramble timing TS and the scramble flag VS are delimited every one or more bits, for example, or are alternately transmitted whereby an error of each of the scramble timing TS and the scramble flag VS is made to ½ with respect to a transmitting error which is generated in the form of a burst. Thus, an attempt is made to improve the security with respect to the error.

Subsequently, the description of the VBI corresponding decoder 5 shown in FIG. 2 will be conducted. In the VBI corresponding decoder 5, the audio signal and the scrambled video signal which are multiplexed in frequency are first separated from each other by the separation part 61. The packets which are multiplexed during the vertical blanking period of the scrambled video signal are separated from each other by the VBI separation part 63. A signal processing IC (a waveform equivalent IC, a synchronization separation IC, a character multiple extracting IC or the like) which has been developed for character multiple broadcasting receiving can be utilized to the VBI separation part 63. The packets which are separated from each other by the VBI separation part 63 are separated into the relevant information packets and the scramble timing TS packets in accordance with the sort identification thereof in the separation part 65.

The scramble timing TS packets which are separated from each other by the separation part 65 are judged in majority in the majority judgment part 85 so that the scramble timing TS and the scramble flag VS are extracted. As described in the description of FIG. 4, the majority judgment part 85 carries the majority judgment processing into practice within the data of the scramble timing TS packets. The extracted scramble timing TS and scramble flag VS, and the combination of TS and VS are corrected by an SDSC code in the error correction part 90. The scramble timing TS and the scramble flag VS are inputted respectively to the PN generator 87 and the descrambler 89.

Further, the relevant information packets which are separated from each other by the separation part 65 are separated into packets of the common information (the program information and the control information), the individual information and the message information in accordance with the sort identification by the separation part 67. Of them, the common information (the program information and the control information) packets are judged in majority in the majority judging part 68 and, thereafter, the judgment result passes through the error correction part 69 and is inputted to the decoding part 77. The majority judgment part 68 judges, in majority, the data of the common information packets which are successively sent three times from the head end 3. Moreover, the individual information packets pass through the error correction part 72 and, thereafter, are inputted to the decoding part 73. Since the message information packets are not enciphered, the message information packets pass through the error correction part 74 and, thereafter, are displayed on the message display part 91 as they are.

In the common information (the program information and the control information) packets, the information including the cipher keys KS is decoded at the decoding part 77 by the use of the cipher keys KW. The acquired PN initial value KS is inputted to the PN generator 87. The other data are given to the attention right-or-wrong judgment part 79. Furthermore, in the individual information packets, the cipher keys KW or the like are decoded in the decoding part 73 by the use of the cipher keys KMi and, thereafter, are stored in the individual information memory 75.

In the attention right-or-wrong judgment part 79, the program information and the data within the individual information memory 75 are compared with each other, and the attention right-or-wrong judgment is conducted. In accordance with the judgment, the descrambler 89 conducts ON/OFF of the descramble operation. Specifically, if the contents of the individual information does not agree with the program so that the result of the attention right-or-wrong judgment is "no", the decoder cannot descramble the program even if the viewer is contracted.

Subsequently, protection against the errors of the relevant information packets and the scramble timing TS packets will be described.

In the chargeable satellite broadcasting system, if the relevant information packets, the scramble timing TS, the scramble flag VS and the scramble flag R#8 cannot be received, the descrambling becomes impossible. Accordingly, it will be necessary or be required to provide protection against the errors in consideration of an error ratio which is generated in the transmission path.

A method of protection with respect to the errors will be described. However, this includes a method of successively sending the same packets, a method of adding the error correction codes to conduct correction or revision, a method of successively sending the same data (all 0, all 1 or the like, for example) so that the data are judged, in majority, on the receiving side, or the like. In view of this, the protection against the errors as shown in the following (1)–(3) is conducted with respect to the relevant information packets and the scramble timing TS packets.

(1) Packet Successive Sending (Head End)

The common information (the program information and the control information) packets: Two lines during the vertical blanking period are utilized to successively send, three times, the same packets over two fields. With regard to the common information packets, the majority judgment is conducted on the decoder side, regarding the packets which are successively sent three times. With regard to the same bit digit of the data portion of the packets, if the bit value is [0] for two or more times out of the triple successive sending, it is judged as being [0], while, if the bit value is [1] for two more times it is judged as being [1].

The individual information packets: No successive sending

The message information packets: No successive sending

The scramble timing TS packets: When the scramble timing TS=1, two lines during the vertical blanking period are used to successively send two times the same packets over one field. Regarding the scramble timing TS packets, the arrangement is such that the majority judgment processing within the data is carried into practice on the decoder side as described previously. Successive sending is conducted two times here so that an attempt is made to improve the error ratio due to the successive sending on the decoder side. When TS=0, the successive sending is not conducted.

(2) The sort identification and the error detection thereof (VBI corresponding decoder)

The common information (the program information and the control information) packets;

The sort identification: 01111000. The error of the sort identification of the common information packets is allowed up to 2 bits error.

The individual information packets;

The sort identification: 10000111. Coincident detection of all bits is conducted.

The message information packets;

The sort identification: 10000110. Coincident detection of all bits is conducted.

The scramble timing TS packets;

The sort identification: 00011101. The error of the sort identification of the scramble timing TS packets is allowed up to 3 bits error.

(3) The packet data and the error correction thereof
(VBI corresponding decoder)

---

· The common information (the program
information and the control information) packets;
    SDSC Correction
· The individual information packets;
    SDSC Correction
· The message information packets;
    SDSC Correction
· The scramble timing packets;
    SDSC Correction

---

In this connection, SDSC is an abbreviation for a (272, 190) shortened difference set cycle code which is employed in the chargeable satellite broadcasting system.

Regarding the majority judgment of the common information packets on the decoder side, the majority judgment corresponding to triple successive sending is conducted regarding each of the bit digits of the first bit through the 182nd bits and with regard to the data portion of 182 bits which are successively sent three times. Specifically, regarding the corresponding digit of the data portion of the packets, if two or more bit values corresponding to triple successive sending are the same as each other, then the bit values occurring twice or more than twice are deemed to be a correct bit value. If the bit values are [0] two or more times, it is judged as being [0], while, if the bit values are [1] two or more times, it is judged as being [1]. For example, it is assumed that, with regard to the data consisting of 182 bits which are successively sent three times, [0001 . . . ] is received by the first transmission, [0101 . . . ] is received by the second transmission, and [0111 . . . ] is received by the third transmission. Then, comparing the first bit in each transmission, the bits which are successively sent three times are [0,0,0 it is judged as being [0] as a result of the majority judgment. Since, with respect to the second bit, the bits which are successively sent three times are [0, 1, 1], it is judged as being [1] as a result of the majority judgment. Since, with respect to the third bit, the bits which are successively sent three times are [0, 0, 1], it is judged as being [0] as a result of the majority judgment. Since, with respect to the fourth bit, the bits which are successively sent three times are [1, 1, 1], it is judged as being [1] as a result of the majority judgment. Hereunder, the majority judgment is conducted similarly with each of the digits until the 182nd bit.

In connection with the above, regarding the majority judgment of the data portion of the scramble timing TS packets on the decoder side, the majority method is changed in accordance with the errors of the sort identification.

---

· · When the error generation of the sort
identification is 0 or 1 bit:
    72/91 majority
· When the error generation of the sort
identification is 2 or 3 bits:
    78/91 majority

---

Specifically, when the error generation ratio is smaller since the error at the sort identification codes is 0 or 1, a threshold value thereof is set to 72 bits of 91 bits to reduce the threshold value of the majority. Further, when the error generation ratio is higher since the error at the sort identification codes is 2 or 3, a threshold value thereof is set to 78 bits of 91 bits to raise the threshold value of the majority.

As described above, according to the above described embodiment, in the head end, the number of successive sending times of the common information packets in the relevant information packets which are separated from the audio signal is reduced so that re-transmission is conducted. Accordingly, it is possible to eliminate the crowding in the transmission path of the cable, and it is possible to reduce the required number of successive sending times which to the minimum number in order to conduct the majority judgment on the decoder side.

In connection with the above, in the embodiment described above, it is assumed that the atmospheric system which transmits the signal by the wave from the transmitter to the head end through the satellite is the first signal transmission system, and the cable system which transmits the signal from the head end to the decoder (the terminal side) is the second signal transmission system. However, the invention can be applied to case where the first signal transmission system is the cable system, without being limited to case where the first signal transmission system is the atmospheric system.

In connection with the above, in the embodiment described above, a case has been described where the number of successive sending times of the common information packets in the satellite system (the transmission side), that is, the first signal transmission system is 5, while the number of successive sending times of the common information packets in the head end (the second signal transmission system) is 3. However, the invention should not be limited to these numbers. The number of successive sending times of the common information packets in the head end may be any odd number which does not include 1, and the number of successive sending times of the common information packets in the satellite number of system (transmission side) may be any odd number greater than the number of sending times of the head end. The fact that the number of successive sending times of the common information packets is the odd is because the majority judgment must be conducted in the head end and the decoder (terminal side).

In connection with the above, the present invention should not be limited only to the embodiments described above, but is capable of being variously modified and carried into practice within the scope which is not departed from the gist of the invention.

AVAILABILITY IN INDUSTRY

As described above, according to the invention. successive sending processing means is provided for transmitting the information packets to the second signal transmission system by the number of successive sending times which is less than that of the first signal transmission system. Accordingly, it is possible to eliminate the confusion of the transmission path. Further, packets having the same contents as each other are transmitted a plurality of times from the first signal transmission system to the second signal transmission system at the same timing as the video signal. Accordingly, the packets of the majority judgment can be taken in or be fetched at the same timing as the video signal, on the decoder side. Thus, it is possible to accurately conduct the detection of the packets.

What is claimed is:

1. A repeating device for receiving a transmission signal transmitted through a first transmission system to send the transmission signal to a second transmission system, said transmission signal including a main signal and n first information packets, wherein each of the first information packets have the same content, n being a number greater than 1, said repeating device comprising:

separation means for separating and extracting said main signal and said first information packets from the transmission signal transmitted through said first transmission system; and signal sending means for superimposing upon said main signal a second information packet having the same content as that of each of said first information packets separated by said separation means, said signal sending means superimposing the second information packet m times wherein m is greater than 1 and less than n, to send out the second information packet to said second transmission system a sufficient number of times to maintain transmission accuracy and to conduct a majority judgment in a decoder coupled with said second transmission system.

2. A repeating device for receiving a broadcasting signal transmitted through a first transmission system to send the transmission signal to a second transmission system, said broadcasting signal including a scrambled signal processed in scrambled form and n first information packets necessary for descrambling the scrambled signal, wherein each of the first information packets have the same content, n being a number greater than 1, said repeating device comprising:

separation means for separating and extracting said scrambled signal and said first information packets from the broadcasting signal transmitted through said first transmission system; and signal sending means for superimposing upon said scrambled signal a second information packet having the same content as that of each of said first information packets separated by said separation means, said signal sending means superimposing the second information packet m times wherein m is greater than 1 and n is greater than m, to send out the second information packet to said second transmission system a sufficient number of times to maintain transmission accuracy and to conduct a majority judgment in a decoder coupled with said second transmission system.

3. A repeating device according to any one of claims 1 and 2, wherein n and m are odd numbers.

4. A repeating device according to any one of claims 1 and 2, wherein n=5 and m=3.

5. A repeating device for receiving a broadcasting signal transmitted through a first transmission system to send the broadcasting signal to a second transmission system, said broadcasting signal including a scrambled signal processed in scrambled form and information packets necessary for descrambling the scrambled signal, said repeating device comprising:

separation means for separating and extracting said scrambled signal and said information packets from the broadcasting signal transmitted through said first transmission system;

error correction means having means for conducting error correction of said information packets separated by said separation means and means for judging the success or failure of the correction;

means for outputting corrected information packets when said judgment means indicates that the error correction was successful and for preventing output of the information packets when said judgment means indicates that the error correction was not successful; and signal sending means for superimposing said corrected information packets outputted from said outputting means onto the scrambled signals separated by said separating means to send out the corrected information packets to said second transmission system.

6. A repeating device according to claim 5 wherein said information packets separated by said separation means include n information packets, each having the same content, and said corrected information packets outputted from said signal sending means include m corrected information packets, each having the same contents wherein m is greater than 1 and n is greater than m.

7. A repeating device according to claim 5 wherein said outputting means comprises a plurality of switches connecting said error correction means to said signal sending means wherein said switches are closed when said judgment means indicates that the error correction was successful and said switches are open when said judgment means indicates that the error correction was not successful.

* * * * *